(12) United States Patent
Ebihara et al.

(10) Patent No.: US 7,327,596 B2
(45) Date of Patent: Feb. 5, 2008

(54) ELECTROSTATIC CAPACITANCE DETECTION DEVICE AND SMART CARD

(75) Inventors: Hiroaki Ebihara, Fujimi-machi (JP); Mitsutoshi Miyasaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 232 days.

(21) Appl. No.: 11/207,841

(22) Filed: Aug. 22, 2005

(65) Prior Publication Data

US 2006/0072355 A1 Apr. 6, 2006

(30) Foreign Application Priority Data

Oct. 5, 2004 (JP) ............................. 2004-292356
Aug. 8, 2005 (JP) ............................. 2005-230143

(51) Int. Cl.
*G11C 11/24* (2006.01)
(52) U.S. Cl. ...................................... 365/149; 365/102
(58) Field of Classification Search ................ 365/149, 365/102; 324/662
See application file for complete search history.

(56) References Cited

U.S. PATENT DOCUMENTS

| | | | |
|---|---|---|---|
| 6,411,727 B1 | 6/2002 | Harkin | |
| 6,448,790 B1 * | 9/2002 | Imai ........................... | 324/661 |
| 7,116,116 B2 * | 10/2006 | Ebihara et al. ............. | 324/662 |
| 7,127,089 B2 | 10/2006 | Miyasaka | |

FOREIGN PATENT DOCUMENTS

| | | |
|---|---|---|
| JP | A-10-191174 | 7/1998 |
| JP | 11-118415 | 4/1999 |
| JP | 2000-346608 | 12/2000 |
| JP | 2001-056204 | 2/2001 |
| JP | 2001-133213 | 5/2001 |
| JP | A-2001-523349 | 11/2001 |
| JP | A-2003-254706 | 9/2003 |
| JP | 2004-317353 | 11/2004 |
| JP | 2005-049194 | 2/2005 |
| JP | 2005-061878 | 3/2005 |
| JP | 2005-069869 | 3/2005 |
| WO | WO 03/050563 A2 | 6/2003 |

* cited by examiner

*Primary Examiner*—Anh Phung
(74) *Attorney, Agent, or Firm*—Oliff & Berridge, PLC (57) ABSTRACT

An electrostatic capacitance detection device, for detecting electrostatic capacitance that changes in accordance with a distance from a target object to read surface contours of the target object, can sense electrostatic capacitance highly accurately even with using thin-film semiconductor devices. The electrostatic capacitance detection device includes electrostatic capacitance detection elements arranged in M rows and N columns, a power supply line that supplies power to the electrostatic capacitance detection elements, an output line that outputs a signal from the electrostatic capacitance detection elements, M row lines that select the electrostatic capacitance detection elements disposed on a specific row, and N column lines that select the electrostatic capacitance detection elements disposed on a specific column. Further, the electrostatic capacitance detection elements each include a signal detection element, a row selection element, a column selection element, and a signal amplification element.

7 Claims, 8 Drawing Sheets

ELECTROSTATIC CAPACITANCE DETECTION DEVICE AND SMART CARD

BACKGROUND

The present invention relates to an electrostatic capacitance detection device that reads the surface contours of a target object having extremely small projections and recesses, such as a fingerprint, by detecting electrostatic capacitance, which changes according to the distance from the surface of the target object, and also relates to a smart card including the electrostatic capacitance detection device.

Figure 10:
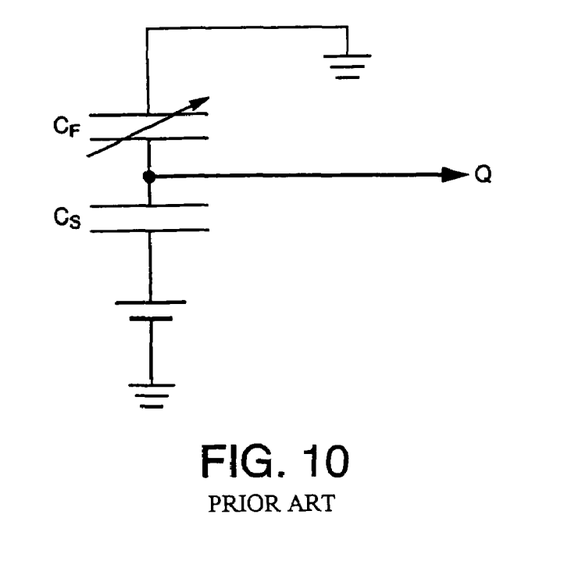
FIG. 10 is a schematic for illustrating the operational principle of related art.

In related-art electrostatic capacitance detection devices used for fingerprint sensors or other applications, a sensor electrode and a dielectric film provided on the sensor electrode are formed on a single-crystal silicon substrate. Examples of the related art are Japanese Unexamined Patent Publications No. 11-118415, No. 2000-346608, No. 2001-56204, and No. 2001-133213. FIG. 10 in this specification illustrates the operational principle of a related-art electrostatic capacitance detection device. A sensor electrode and a dielectric film serve as one electrode and a dielectric film of a capacitor. A human body serves as the other electrode grounded. The electrostatic capacitance $C_F$ of this capacitor changes according to the ridges and valleys in a fingerprint in contact with the surface of the dielectric film. Furthermore, another capacitor with electrostatic capacitance $C_S$ is provided for the semiconductor substrate. These two capacitors are coupled to each other in series, and a predetermined voltage is applied thereto. This voltage application generates a charge Q corresponding to the ridges and valleys in the fingerprint between two capacitors. This charge Q is sensed using typical semiconductor technologies to read the surface contours of the target object.

In recent years, it has been strongly suggested that personal identification functions ought to be provided on cards such as credit cards and bankcards to increase card security. Under this trend, fingerprint sensors detecting electrostatic capacitance have been expected to be used for a smart cart or the like since the fingerprint sensors can be fabricated as thin film devices and thus have smaller size and lighter weight compared with other biological identification devices. However, the related-art electrostatic capacitance detection devices, fabricated on a single-crystal silicon substrate, have little flexibility, which problematically causes difficulties of fabricating the detection devices on a plastic substrate.

To avoid this problem, a transfer technology referred to as SUFTLA (refer to Japanese Unexamined Patent Publication No. 11-312811, and Society for Information Display, p. 916 (2000), S. Utsunomiya et. al., for example) can be used to fabricate semiconductor integrated circuits on a plastic substrate. Using this technology eliminates the need to use an expensive substrate such as a single-crystal silicon substrate, produced with tremendous energy consumption, and thus allows the device to be fabricated at low costs without wasting precious global resources.

For the above-described technical background, it is preferable that electrostatic capacitance detection devices provided on a plastic substrate or the like are fabricated using thin-film semiconductor devices. However, it is very difficult, with current thin-film semiconductor device techniques, to fabricate electrostatic capacitance detection devices based on the conventional operational principle of FIG. 10 with using thin-film semiconductor devices. This is because the charge Q induced between two capacitors coupled in series is extremely small. Specifically, in contrast to single-crystal silicon LSI techniques that allow highly precise sensing and can therefore read the minute charge Q accurately, thin-film semiconductor devices cannot read the minute charge Q accurately since the thin-film semiconductor devices have inferior transistor characteristics and larger characteristics variation among devices compared with the single-crystal silicon LSI techniques.

SUMMARY

An advantage of the invention is to provide an electrostatic capacitance detection device that can sense electrostatic capacitance highly accurately even with using thin-film semiconductor devices. Specifically, an advantage of the invention is to provide an excellent electrostatic capacitance detection device operating stably that can reduce unnecessary manufacturing energy and labor, and can be fabricated on a substrate other than a single-crystal silicon substrate. More specifically, an advantage of the invention is to provide an electrostatic capacitance detection device ensuring excellent operation, with using thin-film semiconductor devices.

An aspect of the invention is to provide an electrostatic capacitance detection device for detecting electrostatic capacitance that changes in accordance with a distance from a target object to read surface contours of the target object. The electrostatic capacitance detection device includes: electrostatic capacitance detection elements arranged in M rows and N columns; a power supply line supplying power to the electrostatic capacitance detection elements; an output line outputting a signal from the electrostatic capacitance detection elements; M row lines selecting the electrostatic capacitance detection elements disposed on a specific row; and N column lines selecting the electrostatic capacitance detection elements disposed on a specific column. The electrostatic capacitance detection elements each includes: a) a signal detection element storing a charge in accordance with the electrostatic capacitance; b) a row selection element causing the electrostatic capacitance detection element to enter a selected state in response to a signal from the row line; c) a column selection element causing the electrostatic capacitance detection element to enter a selected state in response to a signal from the column line; and d) a signal amplification element amplifying a signal corresponding to the charge stored in the signal detection element. The signal detection element includes a capacitance detection electrode and a reference capacitor. The signal amplification element is a thin-film semiconductor device for signal amplification including a source electrode, a drain electrode and a gate electrode. The row selection element is a thin-film semiconductor device for row selection including a source electrode, a drain electrode and a gate electrode. The column selection element is a thin-film semiconductor device for column selection including a source electrode, a drain electrode and a gate electrode. The reference capacitor includes a reference capacitor first electrode, a reference capacitor dielectric film and a reference capacitor second electrode. The gate electrode of the thin-film semiconductor device for signal amplification, the capacitance detection electrode, and the reference capacitor second electrode are coupled to each other. The gate electrode of the thin-film semiconductor device for row selection is coupled to the row line. The gate electrode of the thin-film semiconductor device for column selection is coupled to the column line. The source electrode and the drain electrode of the thin-film semiconductor device for signal amplification, the source electrode and the drain electrode of the thin-film semiconductor device for row selection, and the source electrode and the drain electrode of the thin-film semiconductor device for column selection are coupled in series between the power supply line and the output line. The on-resistance of the thin-film semiconductor device for row selection and the on-resistance of the thin-film semiconductor device for column selection are smaller than the on-resistance of the thin-film semiconductor device for signal amplification.

In this configuration, regarding the on-resistance of the thin-film semiconductor devices for signal amplification, row selection and column selection that are coupled to each other in series between the power supply line and the output line, the on-resistance of the thin-film semiconductor devices for row selection and column selection are set to be smaller than the on-resistance of the thin-film semiconductor device for signal amplification. By thus adequately setting the resistance values of the thin-film semiconductor devices for signal amplification, row selection and column selection, lowering of detection sensitivity can be avoided while the surface contours of a target object can be measured favorably.

In the above-described aspect, the source electrode of the thin-film semiconductor device for signal amplification is preferably coupled to the power supply line. The drain electrode of the thin-film semiconductor device for signal amplification is preferably coupled to the source electrode of the thin-film semiconductor device for column selection. The drain electrode of the thin-film semiconductor device for column selection is preferably coupled to the source electrode of the thin-film semiconductor device for row selection. The drain electrode of the thin-film semiconductor device for row selection is preferably coupled to the output line.

In addition, in the aspect, it is preferable that the reference capacitor first electrode is coupled to the column line, and both the thin-film semiconductor device for signal amplification and the thin-film semiconductor device for column selection are either one of an N-type semiconductor device and a P-type semiconductor device. Alternatively, it is also preferable that the reference capacitor first electrode is coupled to the row line, and both the thin-film semiconductor device for signal amplification and the thin-film semiconductor device for row selection are either one of an N-type semiconductor device and a P-type semiconductor device. Furthermore, it is preferable that the output line is individually provided for each column.

Furthermore, in the aspect, it is preferable that a reference capacitor capacitance $C_R$ is sufficiently larger than a transistor capacitance $C_T$ of the thin-film semiconductor device for signal amplification, if the reference capacitor capacitance $C_R$ and the transistor capacitance $C_T$ are defined as follows:

$$C_R = \epsilon_0 \cdot \epsilon_R \cdot S_R / t_R$$

$$C_T = \epsilon_0 \cdot \epsilon_{ox} \cdot S_T / t_{ox}$$

where $S_R$ (μm$^2$) is the area of an electrode of the reference capacitor, $t_R$ (μm) is the thickness of the reference capacitor dielectric film, $\epsilon_R$ is the relative dielectric constant of the reference capacitor dielectric film, $S_T$ (μm$^2$) is the area of the gate electrode of the thin-film semiconductor device for signal amplification, $t_{ox}$ (μm) is the thickness of a gate insulating film of the thin-film semiconductor device for signal amplification, $\epsilon_{ox}$ is the relative dielectric constant of the gate insulating film, and $\epsilon_0$ is the permittivity in vacuum.

Moreover, the above-described electrostatic capacitance detection device as a target object detection sensor may be incorporated in a smart card.

BRIEF DESCRIPTION OF THE DRAWINGS

The invention will be described with reference to the accompanying drawings, wherein like numbers refer to like elements, and wherein.

DETAILED DESCRIPTION OF EMBODIMENTS (Basic Principle)

Figure 1:
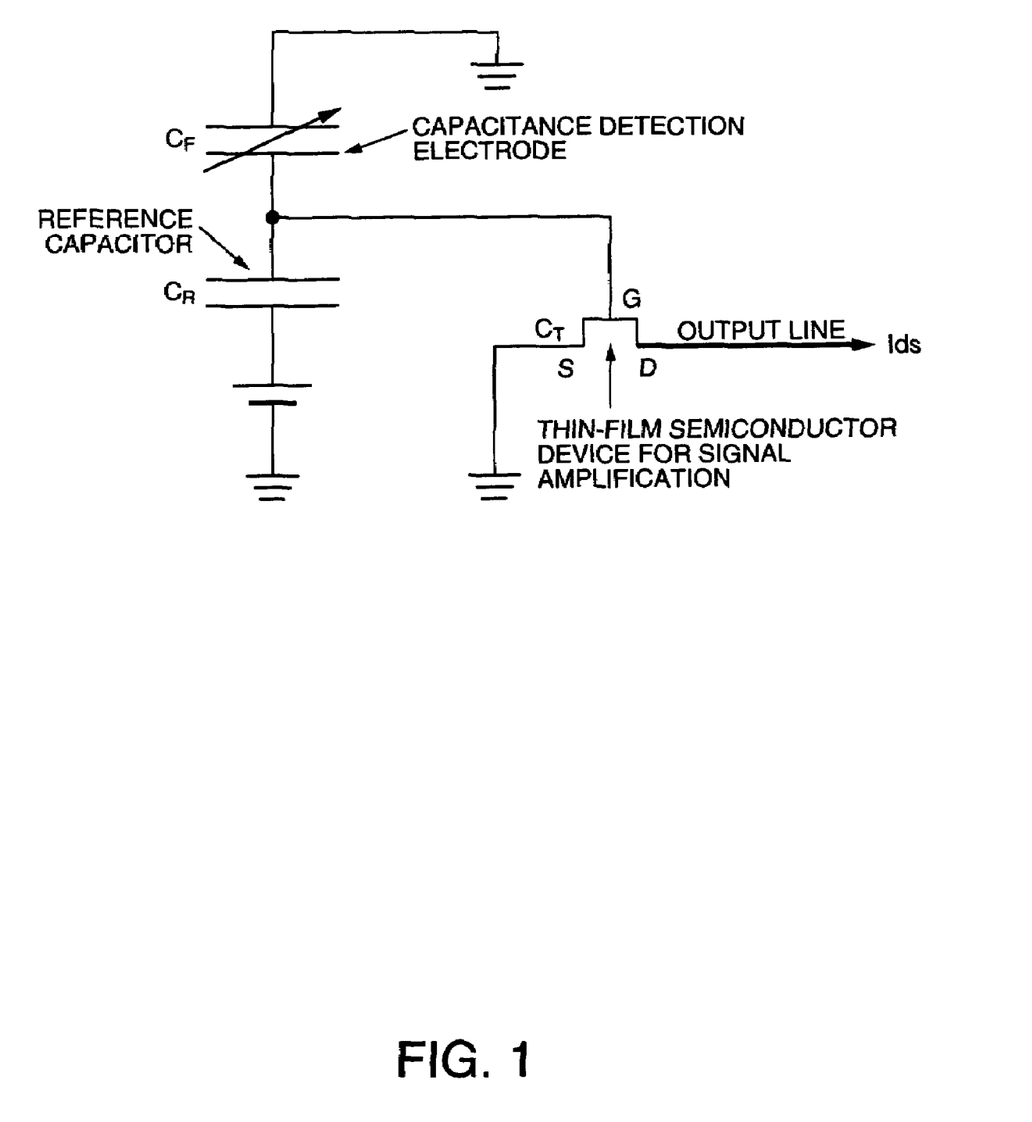
FIG. 1 is a schematic for illustrating the operational principle of an embodiment of the invention.

The basic principle of embodiments of the invention will be described with reference to FIG. 1.

A potential $V_G$ is induced among a capacitor having electrostatic capacitance $C_F$ that changes according to the surface contours of a target object, a reference capacitor having electrostatic capacitance $C_R$, and a thin-film semiconductor device for signal amplification having transistor capacitance $C_T$. The induced potential $V_G$ is coupled to a gate electrode G of the thin-film semiconductor device for signal amplification to vary the gate potential of the semiconductor device. If a predetermined voltage is applied to a drain region D of the thin-film semiconductor device at this state, the induced gate potential $V_G$ markedly modulates a current $I_{ds}$ flowing between the source and drain of the thin-film semiconductor device. The charge Q produced at the gate electrode and so forth in accordance with the potential $V_G$ is retained without flowing, which keeps the current $I_{ds}$ constant. Therefore, a higher drain voltage, longer measurement time or the like facilitates measurement of the current $I_{ds}$. Thus, the surface contours of a target object can be measured sufficiently accurately even if thin-film semiconductor devices are used. A signal (current or voltage) resulting from amplification of electrostatic capacitance information of the target object is read via an output line. In order to measure the electrostatic capacitance of the target object, the current $I_{ds}$ via the signal amplification element may be measured. Alternatively, the voltage V, via the signal amplification element, corresponding to the current $I_{ds}$ may be measured. Although the following description relates to the case of measuring the current $I_{ds}$, the embodiments of the invention are also effective in the case of measuring the voltage V.

FIRST EMBODIMENT

The circuit arrangement according to an embodiment of the invention will be described with reference to FIG. 2.

An electrostatic capacitance detection device of the embodiment includes electrostatic capacitance detection elements 1 arranged in M rows and N columns (M and N denote an integer equal to or greater than 1), power supply lines P supplying power to the detection elements 1, and output lines O outputting a signal from the detection elements 1. The detection device also includes M row lines R and N column lines C that select only the detection elements 1 disposed on a specific row and select only the detection elements 1 disposed on a specific column, respectively. Each electrostatic capacitance detection element 1 is disposed between the power supply line P and the output line O. Thus, by applying a specific voltage between the power supply line P and the output line O, a signal in accordance with electrostatic capacitance detected by the detection element 1 is output to the output line O.

As described above, each electrostatic capacitance detection element 1 includes a signal amplification element T2 and a signal detection element (4 and 5) as essential elements. The signal detection element (4 and 5) includes a capacitance detection electrode 4 and a reference capacitor 5. The signal amplification element T2 is a thin-film semiconductor device for signal amplification having a source electrode, a drain electrode and a gate electrode. The reference capacitor 5 is composed of a reference capacitor first electrode 51, a reference capacitor dielectric film 52, and a reference capacitor second electrode 53. The gate electrode of the thin-film semiconductor device for signal amplification, the capacitance detection electrode 4, and the reference capacitor second electrode 53 are coupled to each other. Furthermore, the electrostatic capacitance detection device of the embodiment includes a capacitance detection dielectric film 6 disposed to cover at least the surface of the capacitance detection electrode 4. The capacitance detection dielectric film 6 also serves as a protective film, and is disposed on the outermost surface. The capacitance detection electrode 4 faces a target object with the intermediary of the capacitance detection dielectric film 6, forming a capacitor having the electrostatic capacitance $C_F$. Applying an adequate voltage to the reference capacitor first electrode 51 in this configuration causes the potential $V_G$ to be induced at the gate electrode of the thin-film semiconductor device for signal amplification.

The electrostatic capacitance detection element 1 of the embodiment includes a row selection element T4 and a column selection element T3 for selecting only the electrostatic capacitance detection element 1 selected by the row line R and the column line C and causing the selected element 1 to output a signal to the output line O. Such a configuration enables only the electrostatic capacitance detection element 1 disposed on a specific row and column to be selected uniquely even when the plural detection elements 1 are coupled to the output line O. Therefore, signals from the detection elements 1 can be extracted from the output line O without interference among the signals. Specifically, the row selection element T4 is a thin-film semiconductor device for row selection having a source electrode, a drain electrode and a gate electrode. The column selection element T3 is a thin-film semiconductor device for column selection having a source electrode, a drain electrode and a gate electrode.

The gate electrode of the thin-film semiconductor device for row selection is coupled to the row line R. Thus, controlling a voltage applied to the row line R can determine whether or not the source and drain of the thin-film semiconductor device for row selection are electrically conducted. Similarly, the gate electrode of the thin-film semiconductor device for column selection is coupled to the column line C. Thus, controlling a voltage applied to the column line C can determine whether or not the source and drain of the thin-film semiconductor device for column selection are electrically conducted.

Note that source and drain electrodes of a thin-film semiconductor device are not differentiated from each other for convenience in the present specification. Simply one electrode is referred to as a source electrode while the other is referred to as a drain electrode. Under the strict physical definition of source and drain electrodes of a transistor, an electrode supplied with a lower potential is a source electrode in an N-type transistor, while one supplied with a higher potential is a source electrode in a P-type transistor. However, which electrode is supplied with a higher potential changes depending on an operation state. Accordingly, source and drain electrodes are interchangeable in one transistor in a precise sense. In the specification, such strictness is excluded for simple description, and one electrode is referred to as a source electrode, while the other is referred to as a drain electrode for convenience.

In order to obtain, via the output line O, a signal only from the specific electrostatic capacitance detection element 1 designated by the row and column lines R and C by using the row and column selection elements T4 and T3, the source and drain electrodes of all of the thin-film semiconductor devices for signal amplification, row selection, and column selection are coupled to each other in series between the power supply line P and the output line O. As described above, providing the column and row selection elements T3 and T4 for each electrostatic capacitance detection element 1 allows unique selection of a column and row, preventing information interference among columns and rows.

It is preferable that the source electrode of the thin-film semiconductor device for signal amplification of the embodiment is coupled to the power supply line P. If the source electrode of the thin-film semiconductor device for row selection is coupled to the power supply line P, the drain electrode of the thin-film semiconductor device for row selection is coupled to the source electrode of the thin-film semiconductor device for signal amplification, the drain electrode of the thin-film semiconductor device for signal amplification is coupled to the source electrode of the thin-film semiconductor device for column selection, and the drain electrode of the thin-film semiconductor device for column selection is coupled to the output line P, the source-drain resistance (Rsa) of the thin-film semiconductor device for signal amplification changes in accordance with the value of electrostatic capacitance read by the signal detection element (4 and 5). In addition, the source voltage of the thin-film semiconductor device for signal amplification changes simultaneously, and thus the gate-source voltage $V_{GS}$ of the thin-film semiconductor device for signal amplification also changes, lowering detection accuracy. In the electrostatic capacitance detection device of the embodiment, therefore, the source electrode of the thin-film semiconductor device for signal amplification is coupled to the power supply line P, the drain electrode of the thin-film semiconductor device for signal amplification is coupled to the source electrode of the thin-film semiconductor device for column selection, the drain electrode of the thin-film semiconductor device for column selection is coupled to the source electrode of the thin-film semiconductor device for row selection, and the drain electrode of the thin-film semiconductor device for row selection is coupled to the output line O. Thus, detection accuracy is improved.

In the case where the thin-film semiconductor devices for signal amplification, row selection and column selection are coupled in series between the output line O and the power supply line P (refer to FIG. 2), detection sensitivity is lowered if the resistance values of the thin-film semiconductor devices for signal amplification, row selection and column selection are not defined appropriately. Specifically, the voltage difference Vds-sa across the source and drain of the thin-film semiconductor device for signal amplification is expressed by the following equation (1).

$$V_{ds-sa} = \frac{R_{sa}}{R_{sa} + R_{sr} + R_{sc}} \Delta V \tag{1}$$

where Rsa is the source-drain resistance of the thin-film semiconductor device for signal amplification, Rsr is the source-drain resistance (on-resistance) of the thin-film semiconductor device for row selection at the selected state, Rsc is the source-drain resistance (on-resistance) of the thin-film semiconductor device for column selection at the selected state, and $\Delta V$ is the voltage difference between the power supply line P and the output line O.

As equation (1) shows, the source-drain voltage Vds-sa of the thin-film semiconductor device for signal amplification changes depending on the ratio of resistance among the signal amplification, row selection and column selection elements T2, T4 and T3. The electrostatic capacitance detection device of the embodiment changes the gate voltage of the thin-film semiconductor device for signal amplification in accordance with detected electrostatic capacitance, so as to read the source-drain current $I_{ds}$ of the thin-film semiconductor device for signal amplification. Therefore, higher Rsa must result in smaller $I_{ds}$ while lower Rsa must result in larger $I_{ds}$. However, equation (1) indicates that higher Rsa leads to larger Vds-sa while lower Rsa leads to smaller Vds-sa. Therefore, detection sensitivity is lowered if each resistance value is not defined appropriately. Specifically, it is preferable that Rsr and Rsc are invariably smaller than Rsa. In the electrostatic capacitance detection element 1 of the embodiment, therefore, the on-resistance Rsr of the thin-film semiconductor device for row selection and the on-resistance Rsc of the thin-film semiconductor device for column selection are set to be smaller than the on-resistance Rsa of the thin-film semiconductor device for signal amplification. This resistance relationship prevents lowering of detection sensitivity and allows favorable measurement of surface contours.

The electrostatic capacitance detection element 1 of the embodiment changes a potential $V_R$ of the first electrode 51 of the reference capacitor 5, and reads a signal in accordance with the potential $V_G$ generated at the gate electrode of the thin-film semiconductor device for signal amplification when the potential $V_R$ is changed. The variation $\Delta V_G$ of the potential $V_G$ depends on the variation $\Delta V_R$ between the potential $V_R$ when the detection element 1 is at the selected state and the potential $V_R$ when the detection element 1 is at the non-selected state. Ideally, $\Delta V_G$ changes within the range of $0 < \Delta V_G < \Delta V_R$ depending on the ratio of electrostatic capacitance between a target object and the capacitance detection electrode 4 to electrostatic capacitance of the reference capacitor 5. It is preferable that, during the period when the electrostatic capacitance detection element 1 is at the non-selected state, the potential $V_G$ is a ground potential (GND) and the target object surface and the capacitance detection electrode 4 have the same potential. Thus, even if the electrostatic capacitance changes due to movement of the target object surface, or the like during the period when the electrostatic capacitance detection element 1 is at the non-selected state, the potential $V_G$ of gate electrode of the thin-film semiconductor device for signal amplification does not change, allowing stable detection of electrostatic capacitance. In this case, since the potential $V_G$ during a non-selected period is 0 V, the potential $V_G$ during a selected period changes within the range of 0 V to $\Delta V_R$. In order to read the change of the source-drain current $I_{ds}$ of the thin-film semiconductor device for signal amplification due to the change of the gate potential $V_G$ of the thin-film semiconductor device for signal amplification, the range of the potential $V_G$ needs to include at least a potential above the threshold voltage of the thin-film semiconductor device for signal amplification. Therefore, it is preferable that the variation $\Delta V_R$ of the potential $V_R$ applied to the first electrode 51 of the reference capacitor 5 between the non-selected period and selected period of the electrostatic capacitance detection element 1 is sufficiently larger than (for example, about twice) the threshold voltage of the thin-film semiconductor device for signal amplification (in the case where the signal amplification element T2 is an N-type transistor). Note that both the variation $\Delta V_R$ and the threshold voltage are negative and the variation $\Delta V_R$ needs to be sufficiently smaller than the threshold voltage when the signal amplification element T2 is a P-type transistor.

Figure 2:
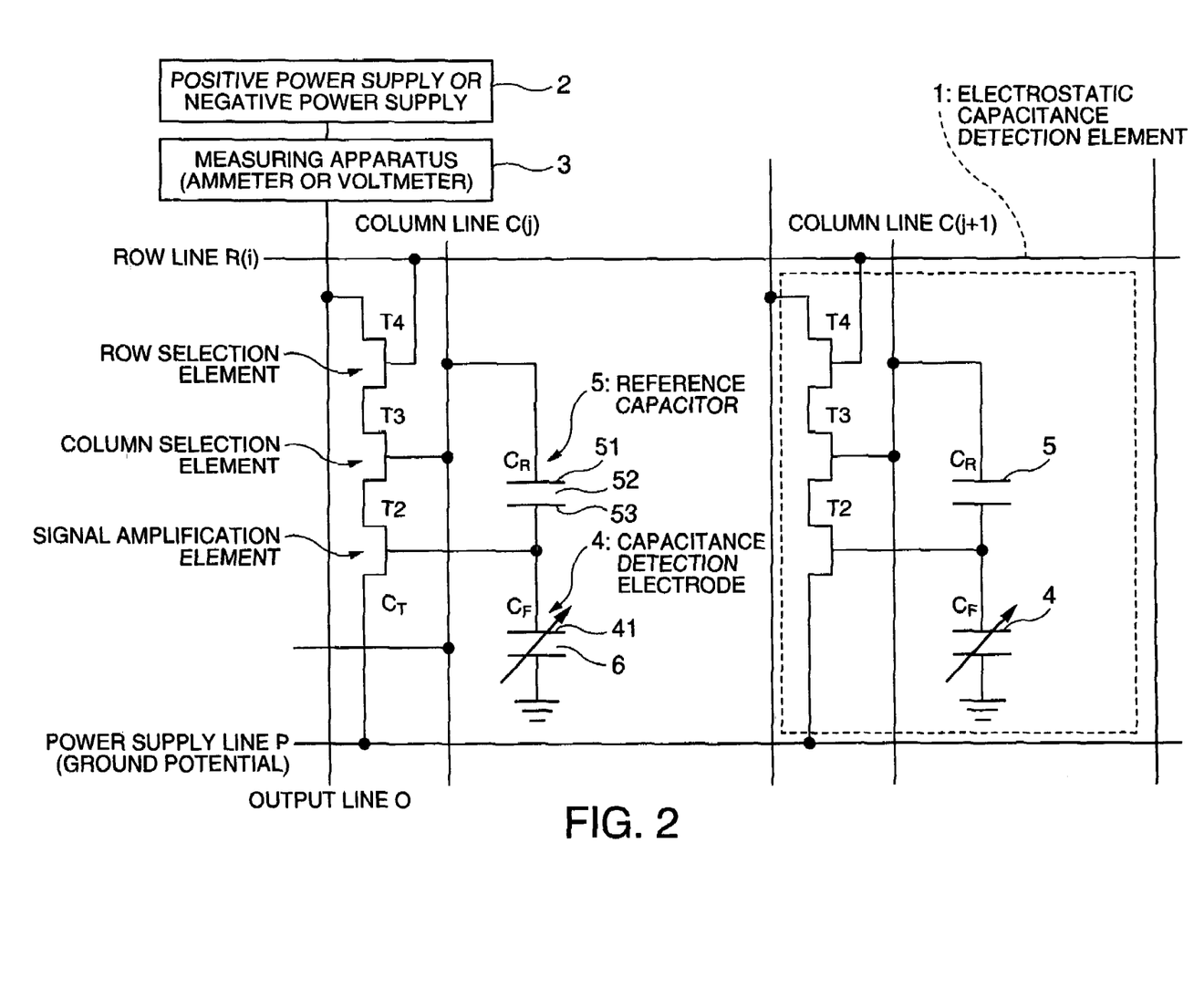
FIG. 2 is a schematic showing the circuit arrangement of an electrostatic capacitance detection device according to a first embodiment of the invention.
Figure 3:
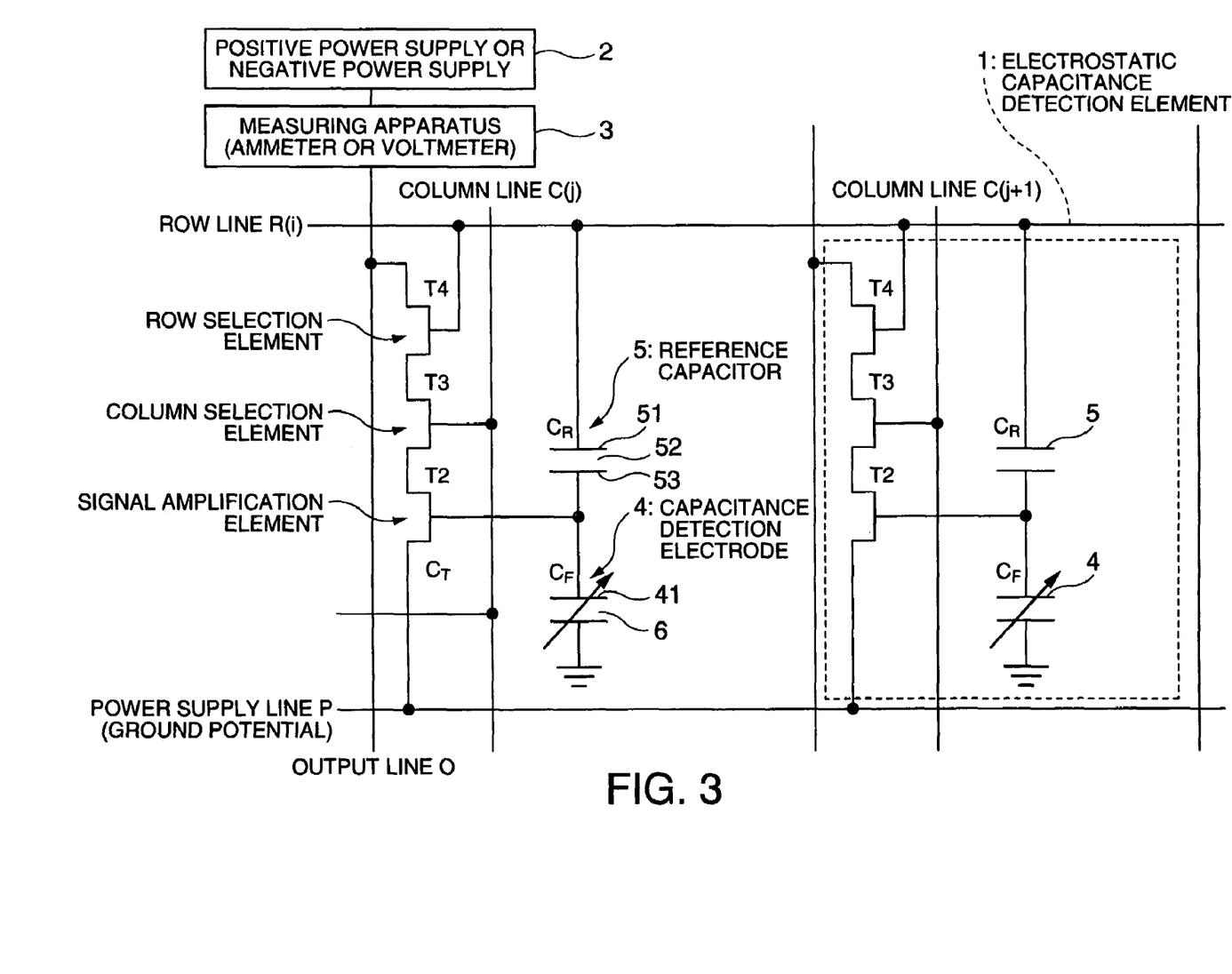
FIG. 3 is a schematic showing the circuit arrangement of the electrostatic capacitance detection device according to the first embodiment.

In the present embodiment, the first electrode 51 of the reference capacitor 5 is coupled to the column line C, and the thin-film semiconductor devices for signal amplification and column selection are a semiconductor device of the same conductivity type (specifically, either one of N-type and P-type semiconductor devices) (refer to FIG. 2). However, the invention is not limited thereto. For example, as shown in FIG. 3, the first electrode 51 of the reference capacitor 5 may be coupled to the row line R, and the thin-film semiconductor devices for signal amplification and row selection may be a semiconductor device of the same conductivity type. It is preferable that a positive power supply ($V_{dd}$) and a ground potential are used if an N-type transistor is used as the thin-film semiconductor device for signal amplification as described later, while a ground potential and a negative power supply ($V_{SS}$) are used if a P-type transistor is used. In the following, only the case where the signal amplification element T2 is an N-type transistor will be described. The column line C is supplied with a ground potential during the period when the thin-film semiconductor device for column selection is at the non-selected state, while being supplied with $V_{dd}$ during the period when it is at the selected state. The row line R is supplied with a ground potential during the period when the thin-film semiconductor device for row selection is at the non-selected state, while being supplied with $V_{dd}$ during the period when it is at the selected state. Typically, a voltage at least twice the threshold voltage of the thin-film semiconductor device is used as the supply potential ($V_{dd}$). Thus, coupling the column or row line C or R to the first electrode 51 of the reference capacitor 5 allows favorable detection of electrostatic capacitance.

The above configuration can eliminate the need to provide circuits and wires for controlling a voltage applied to the first electrode 51 of the reference capacitor 5.

Figure 4:
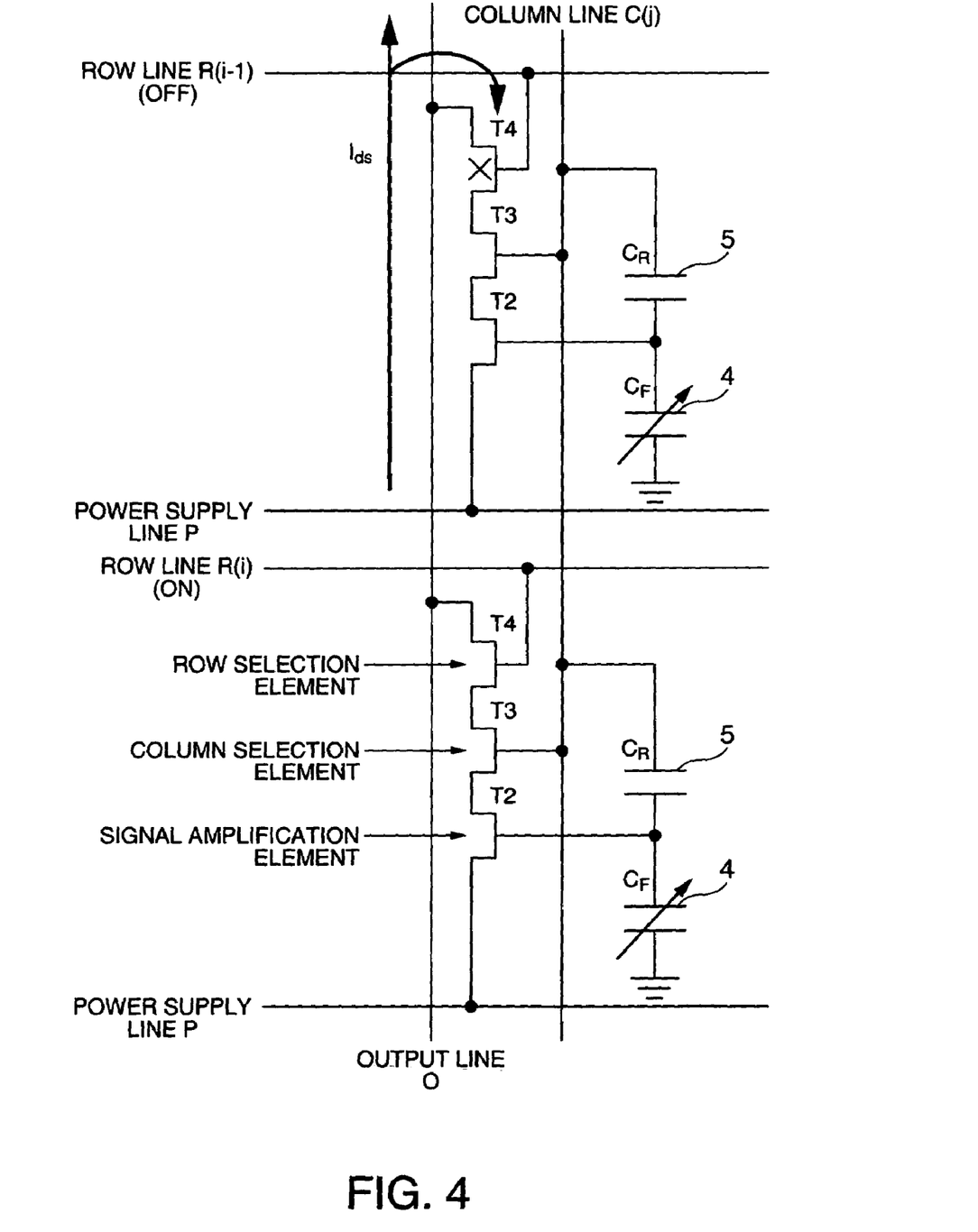
FIG. 4 is a schematic showing the circuit arrangement of the electrostatic capacitance detection device according to the first embodiment.

In the electrostatic capacitance detection device of the embodiment, the output lines O are individually provided for the respective columns. Specifically, if the output line O is provided for each column as shown in FIG. 4, only the thin-film semiconductor devices for row selection are directly coupled to each output line O. Therefore, only the thin-film semiconductor device for row selection disposed on a selected row (row line R(i) in FIG. 4) is turned on, while the thin-film semiconductor devices for row selection disposed on other rows (row line R(i-1) in FIG. 4) are kept off. As a result, parasitic capacitance to the output line O is composed only of the drain capacitance of N thin-film semiconductor devices for row selection and capacitance between the output line and each wire.

Figure 5:
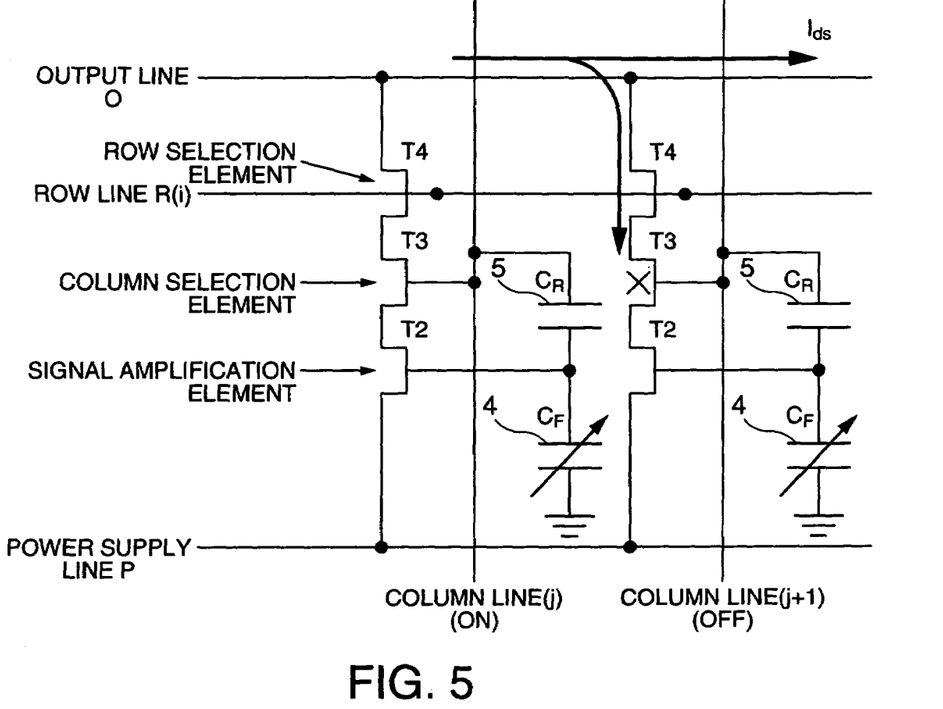
FIG. 5 is a schematic showing the circuit arrangement of the electrostatic capacitance detection device according to the first embodiment.

In contrast, if the output line O is provided for each row, all thin-film semiconductor devices for row selection disposed on a selected row (row line R(i) in FIG. 5) are turned on. Therefore, the gate capacitance of all of N thin-film semiconductor devices for row selection contributes to parasitic capacitance to the output line O. Thus, the parasitic capacitance when the output line O is provided for each row is greatly larger than that when the output line O is provided for each column, which makes it very difficult to read signals from the electrostatic capacitance detection element 1. In order to avoid such a problem, the output line O is provided for each column in the present embodiment as shown in FIG. 4.

In order for the signal amplification element T2 of the embodiment to amplify signals effectively in the above-described configuration, the transistor capacitance $C_T$ of the thin-film semiconductor device for signal amplification, the reference capacitor capacitance $C_R$, and the element capacitance $C_D$ of the signal detection element (4 and 5), shown in FIG. 2 and so forth, should be determined appropriately. The relationship among these capacitances will be described with reference to FIGS. 6 and 7.

Figure 6:
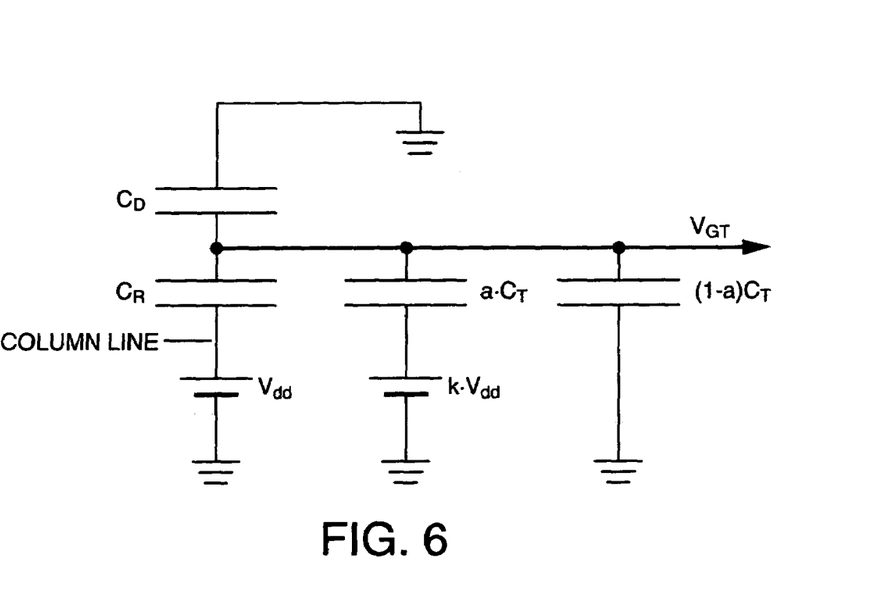
FIG. 6 is a schematic for illustrating the principle of the first embodiment.

First, a situation will be considered in which a projection of an object to be measured is in contact with the capacitance detection dielectric layer 6, and the target object is electrically grounded. Specifically, a situation is assumed in which the electrostatic capacitance detection device is used as a fingerprint sensor, and a ridge of a fingerprint in contact with the surface of the detection device is detected. The reference capacitor capacitance $C_R$ and the transistor capacitance $C_T$ of the thin-film semiconductor device for signal amplification are defined by the following equations (2) and (3), respectively.

$$C_R = \epsilon_0 \cdot \epsilon_R \cdot S_R / t_R \quad (2)$$

$$C_T = \epsilon_0 \cdot \epsilon_{ox} \cdot S_T / t_{ox} \quad (3)$$

where $S_R$ (μm²) is the area of electrode of the reference capacitor 5, $t_R$ (μm) is the thickness of the reference capacitor dielectric film 52, $\epsilon_R$ is the relative dielectric constant of the reference capacitor dielectric film 52, $S_T$ (μm²) is the area of gate electrode of the thin-film semiconductor device for signal amplification, $t_{ox}$ (μm) is the thickness of the gate insulating film, $\epsilon_{ox}$ is the relative dielectric constant of the gate insulating film, and $\epsilon_0$ is permittivity in vacuum.

In addition, the element capacitance $C_D$ of the signal detection element 5 is defined by the following equation (4).

$$C_D = \epsilon_0 \cdot \epsilon_D \cdot S_D / t_D \quad (4)$$

where $S_D$ (μm²) is the area of the capacitance detection electrode 4, $t_D$ (μm) is the thickness of the capacitance detection dielectric film 6, $\epsilon_D$ is the relative dielectric constant of the capacitance detection dielectric film 6, and $\epsilon_0$ is permittivity in vacuum.

The surface of the target object serves as the earth electrode of the element capacitance $C_D$ and the capacitance detection electrode 4 corresponds to the other electrode with the intermediary of the capacitance detection dielectric film 6. The capacitance detection electrode 4 is coupled to the gate electrode of the thin-film semiconductor device for signal amplification and one electrode of the reference capacitor 5, which is equivalent to the situation in which the capacitor having the element capacitance $C_D$ is coupled to the capacitor having the transistor capacitance $C_T$ in series, and the capacitor having the element capacitance $C_D$ is also coupled to the capacitor having the reference capacitor capacitance $C_R$ in series. The other electrode of the reference capacitor 5 is coupled to the column line C, and is supplied with a high potential ($V_{dd}$) when the column line C is selected. In the case in which a positive power supply is used as a supply voltage, specifically in the case in which the power supply line P is supplied with a ground potential and the output line O is a high potential ($V_{dd}$), the drain potential of the thin-film semiconductor device for signal amplification when the column line C is selected is k (0<k≦1) times $V_{dd}$ since the signal amplification element T2 is coupled to the column selection and row selection elements T3 and T4 in series between the power supply line P and the output line O (refer to FIG. 6). The value of k is determined by the resistance values of the thin-film semiconductor devices for column selection, row selection, and signal amplification. Specifically, the value of k is more than zero, and is at most one. The value of k is one if neither the column selection nor row selection elements T3 nor T4 are absent. The gate-drain capacitance and gate-source capacitance of the thin-film semiconductor device for signal amplification are a (0<a≦1) times $C_T$ and (1−a) times $C_T$, respectively (refer to FIG. 6). Since an applied voltage is divided in accordance with each electrostatic capacitance of four capacitors, a voltage $V_{GT}$ applied to the gate electrode of the thin-film semiconductor device for signal amplification at this state (gate voltage when a projection is in contact with the detection device) is expressed as the following equation (5).

$$V_{GT} = \frac{aKC_T + C_R}{C_D + C_T + C_R} \cdot V_{dd} \quad (5)$$

Accordingly, when the element capacitance $C_D$ is sufficiently larger than the sum of the reference capacitor capacitance $C_R$ and the transistor capacitance $C_T$, i.e. $C_R + C_T$, as expressed by the following equation (6), the equation (5) is approximated to the following equation (7). That is, almost no voltage is applied to the gate electrode.

$$C_D >> C_T + C_R \quad (6)$$

$$V_{GT} \approx 0 \quad (7)$$

As a result, the thin-film semiconductor device for signal amplification is at the off state, and thus the current I is extremely small. As described above, in order to cause the thin-film semiconductor device for signal amplification to flow almost no current when a projection of a target object, such as a ridge of a fingerprint, is in contact with the electrostatic capacitance detection device, the various conditions should be set so that the element capacitance $C_D$ is sufficiently larger than the sum $C_R+C_T$ of the reference capacitor and transistor capacitances $C_R$ and $C_T$. The conditions include the area of the gate electrode (gate length and gate width), the area of the reference capacitor electrode (capacitor electrode length and capacitor electrode width), the area of the capacitance detection electrode, and the materials and thicknesses of the gate insulating film, reference capacitor dielectric film and capacitance detection dielectric film, of the detection element 1. The expression "sufficiently larger" in this specification indicates the difference by a factor of about ten or greater. In other words, the element capacitance $C_D$ and the sum $C_R+C_T$ of the reference capacitor and transistor capacitances $C_R$ and $C_T$ should satisfy the relationship expressed by the following equation (8).

$$C_D > 10 \times (C_R + C_T) \tag{8}$$

In this case, $V_{GT}/V_{dd}$ is approximately 0.1 or less, and thus the thin-film semiconductor device cannot enter the on state. In order to surely detect projections of a target object, it is important that the thin-film semiconductor device for signal amplification be in the off state when the projections of the target object are in contact with the electrostatic capacitance detection device. Therefore, if a supply voltage is a high potential ($V_{dd}$), an N-type enhancement mode transistor (normally-off type), which does not flow the drain current when the gate voltage is near zero, is preferably used as the thin-film semiconductor device for signal amplification. More ideal is to use an N-type thin-film semiconductor device for signal amplification in which $V_{min}$ satisfies the relationships of the following equations (9) and (10), if $V_{min}$ is the gate voltage (minimum gate voltage) when the drain current takes the minimum value in transfer characteristics.

$$0 < 0.1 \times V_{dd} < V_{min} \tag{9}$$

$$0 < V_{GT} < V_{min} \tag{10}$$

In contrast, if a supply voltage is a low potential ($V_{SS}$) and a ground voltage is supplied as a high potential ($V_{dd}$), a P-type enhancement mode transistor (normally-off type), which does not flow the drain current when the gate voltage is near zero, is preferably used as the thin-film semiconductor device for signal amplification. More ideal is to use a P-type thin-film semiconductor device for signal amplification in which the minimum gate voltage $V_{min}$ satisfies the relationships of the following equations (11) and (12). These relationships allow sure detection of projections of a target object, indicated by extremely small current value I.

$$V_{min} < 0.1 \times V_{dd} < 0 \tag{11}$$

$$V_{min} < V_{GT} < 0 \tag{12}$$

Next, a situation will be considered in which a target object is not in contact with but separated from the capacitance detection dielectric film 6 by a target object distance $t_A$. Specifically, a situation will be considered in which a recess of an object to be measured is present over the capacitance detection dielectric layer 6, and the target object is electrically grounded. More specifically, a situation is assumed in which the electrostatic capacitance detection device is used as a fingerprint sensor, and a valley of a fingerprint that is present over the surface of the detection device is detected. As described above, in the electrostatic capacitance detection device of the embodiment, it is preferable that the capacitance detection dielectric layer 6 is located on the outermost surface of the electrostatic capacitance detection device.

Figure 7:
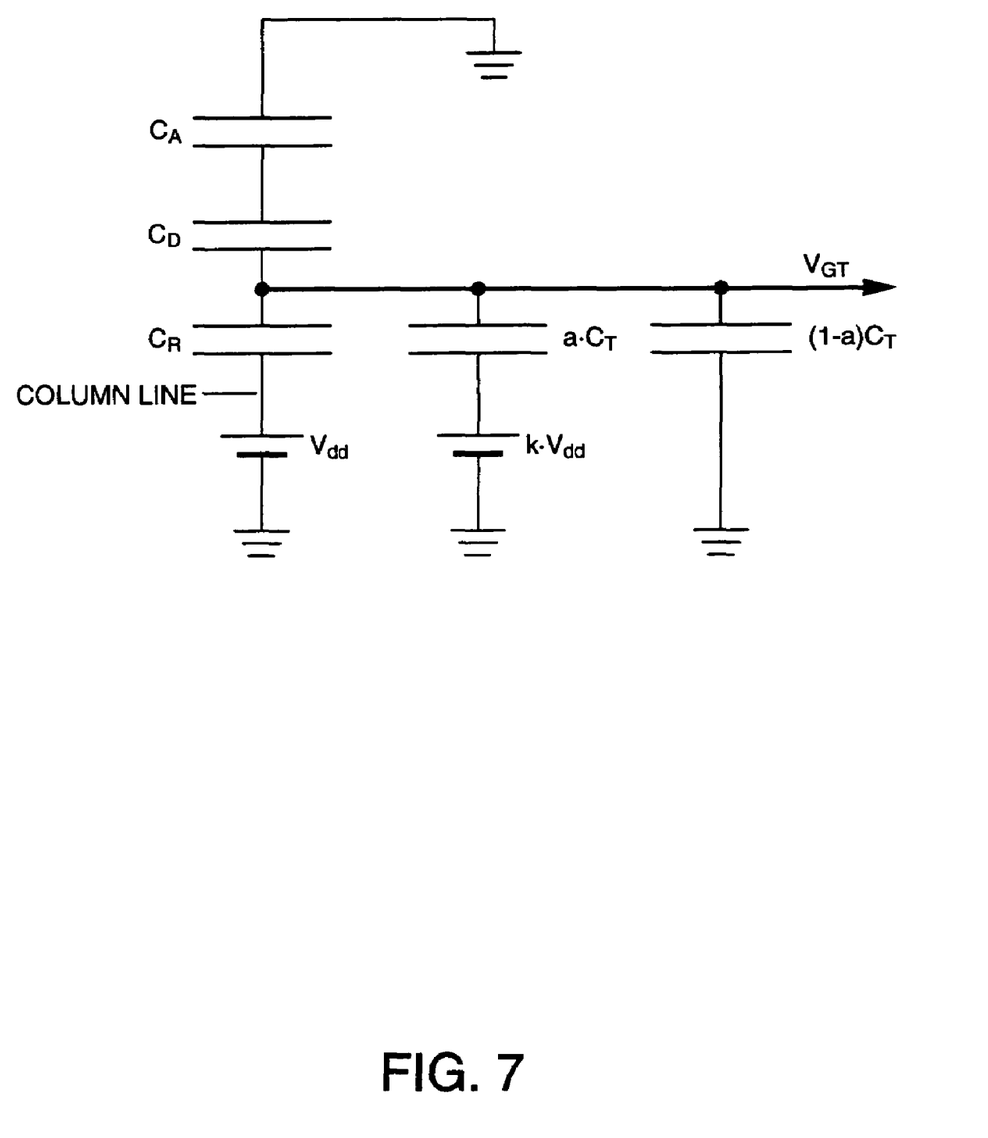
FIG. 7 is a schematic for illustrating the principle of the first embodiment.

An equivalent circuit diagram for this case is shown in FIG. 7. Since the surface of the target object is not in contact with the capacitance detection dielectric layer 6, the capacitance detection dielectric layer 6 and the target object surface form another capacitor with air as a dielectric. The capacitance of the capacitor is referred to as a target object capacitance CA and is defined by the following equation (13), while using the permittivity $\epsilon_0$ in vacuum, the relative dielectric constant $\epsilon_A$ of air, and the area $S_D$ of the capacitance detection electrode 4.

$$C_A = \epsilon_0 \cdot \epsilon_A \cdot S_D / t_A \tag{13}$$

The state in which a target object is thus separated from the capacitance detection dielectric film 6 corresponds to the situation in which the element capacitance $C_D$ and the target object capacitance $C_A$ are coupled in series, and these capacitors are coupled in series to the gate-drain capacitance a $C_T$ and gate-source capacitance $(1-a)C_T$ of the transistor, and the reference capacitor $C_R$, all of which are coupled in parallel each other. The voltage $V_{dd}$ is applied to the reference capacitor first electrode 51. The voltage of k $V_{dd}$ is applied to the drain electrode of the signal amplification element (refer to FIG. 7). The applied voltage is divided by the five capacitors in accordance with the electrostatic capacitance. Therefore, voltage $V_{GV}$ applied to the gate electrode of the thin-film semiconductor device for signal amplification at this state (gate voltage when a valley is present over the detection device) is expressed as the following equation (14).

$$V_{GV} = \frac{aKC_T + C_R}{\frac{C_A C_D}{C_A + C_D} + C_T + C_R} \cdot V_{dd} \tag{14}$$

In the embodiment, the electrostatic capacitance detection element 1 that satisfies the condition of the following equation (15) is fabricated so that the drain current becomes extremely small when a target object is in contact with the detection device. Therefore, equation (14) is approximated to the following equation (16).

$$C_D >> C_T + C_R \tag{15}$$

$$V_{GV} = \frac{V_{dd}}{\frac{C_T + C_R}{aKC_T + C_R} + \frac{C_A}{aKC_T + C_R}} \tag{16}$$

If the reference capacitor $C_R$ is designed to be sufficiently larger than the target object capacitance $C_A$ as shown in the following equation (17), the equation for the gate voltage $V_{GV}$ is further simplified as shown in the following equation (18).

$$C_R >> C_A \tag{17}$$

$$V_{GV} = \frac{aKC_T + C_R}{C_T + C_R} \cdot V_{dd} \tag{18}$$

Thus, if the value of a·k is near one, the gate voltage $V_{GV}$ is substantially equal to the power supply voltage $V_{dd}$. In addition, if the reference capacitor capacitance $C_R$ is designed to be sufficiently larger than the transistor capacitance $C_T$ as shown in the following equation (19), the gate voltage $V_{GV}$ is substantially equal to the power supply voltage $V_{dd}$ regardless of the value of a·k as expressed by the following equation (20).

$$C_R \gg C_T \tag{19}$$

$$V_{GV} \approx V_{dd} \tag{20}$$

As a result, the thin-film semiconductor device for signal amplification can be put into the on state and thus an extremely large current I is obtained. As described above, in order for the thin-film semiconductor device for signal amplification to conduct a large current when a recess of a target object, such as a valley of a fingerprint, is present over the electrostatic capacitance detection device, the reference capacitor capacitance $C_R$ needs to be sufficiently larger than the target object capacitance $C_A$. As described above, since a difference by a factor of about ten is generally considered as "sufficiently larger", the reference capacitor capacitance $C_R$ and the target object capacitance $C_A$ should satisfy the relationship of the following equation (21).

$$C_R > 10 \times C_A \tag{21}$$

Furthermore, in order for the transistor to enter the on state regardless of the value of a·k when a valley of a fingerprint or the like approaches the detection device, the reference capacitor capacitance $C_R$ should be ten times the transistor capacitance $C_T$ or greater as shown in the following equation (22).

$$C_R > 10 \times C_T \tag{22}$$

If those conditions are satisfied, the $V_{GV}/V_{dd}$ is approximately 0.9 or greater, and thus the thin-film semiconductor device easily enters the on state. In order to surely detect recesses of a target object, it is important that the thin-film semiconductor device for signal amplification be in the on state when the recesses of the target object approach the electrostatic capacitance detection device. If a positive power supply is used for the supply voltage $V_{dd}$, an N-type enhancement mode transistor (normally-off type) is used as the thin-film semiconductor device for signal amplification. The threshold voltage $V_{th}$ of this transistor is preferably smaller than $V_{GV}$. More ideally, an N-type thin-film semiconductor device for signal amplification that satisfies the relationship of the following equation (23) is used.

$$0 < V_{th} < 0.91 \times V_{dd} \tag{23}$$

Conversely, if a negative power supply is used for the supply voltage $V_{dd}$, a P-type enhancement mode transistor (normally-off type) is used as the thin-film semiconductor device for signal amplification. Ideally, the threshold voltage $V_{th}$ of the P-type thin-film semiconductor device for signal amplification is preferably larger than $V_{GV}$. More ideally, a P-type thin-film semiconductor device for signal amplification that satisfies the relationship of the following equation (24) is used. This configuration allows sure detection of recesses of a target object, indicated by an extremely large current I.

$$0.91 \times V_{dd} < V_{th} < 0 \tag{24}$$

As a conclusion, in order for the thin-film semiconductor device for signal amplification to flow almost no current when a projection of a target object, such as a ridge of a fingerprint, is in contact with the electrostatic capacitance detection device, while flow a large current when a recess of the target object, such as a valley of a fingerprint, approaches the detection device, to achieve accurate recognition of the projections and recesses of the target object, the detection device needs to be designed to satisfy the following conditions: the element capacitance $C_D$ is sufficiently larger than the sum $C_R + C_T$ of the reference capacitor capacitance $C_R$ and transistor capacitance $C_T$; and the reference capacitor capacitance $C_R$ is sufficiently larger than the target object capacitance $C_A$ when the target object is not in contact with but separated from the capacitance detection dielectric film 6 by the target object distance $t_A$. These relationships are achieved by adjusting various conditions, such as the areas $S_T$ (µm²), $S_R$ (µm²), and $S_D$ (µm²) of gate electrode of the thin-film semiconductor device for signal amplification, electrode of the reference capacitor 5, and capacitance detection electrode, respectively, and the thicknesses $t_{ox}$ (µm), $t_R$ (µm) and $t_D$ (µm) and relative dielectric constants $\epsilon_{ox}$, $\epsilon_R$ and $\epsilon_D$ of the gate insulating film, the reference capacitor dielectric film 52 and the capacitance detection dielectric film 6, respectively. In addition, it is ideal that the reference capacitor capacitance $C_R$ is sufficiently larger than the transistor capacitance $C_T$. More specifically, the electrostatic capacitance detection device is designed so that, under the condition that the reference capacitor capacitance $C_R$ and the transistor capacitance $C_T$ satisfy the relationship of the following equation (25), the element capacitance $C_D$, reference capacitor capacitance $C_R$ and target object capacitance $C_A$ satisfy the relationships of the following equations (26) and (27).

$$C_R > 10 \times C_T \tag{25}$$

$$C_D > 10 \times C_R \tag{26}$$

$$C_R > 10 \times C_A \tag{27}$$

In addition, if a positive potential ($V_{dd}$) is used as the supply voltage, an N-type enhancement mode transistor (normally-off type) is preferably used as the thin-film semiconductor device for signal amplification. In particular, it is ideal to use an N-type enhancement mode transistor in which the minimum gate voltage $V_{min}$ satisfies the relationship of the following equation (28), and the threshold voltage $V_{th}$ is smaller than $V_{GV}$, specifically satisfies the relationship of the following equation (29).

$$0 < 0.1 \times V_{dd} < V_{min} \text{ or } 0 < V_{GT} < V_{min} \tag{28}$$

$$0 < V_{th} < 0.91 \times V_{dd} \text{ or } 0 < V_{th} < V_{GV} \tag{29}$$

In contrast, if a negative potential ($V_{SS}$) is used as the supply voltage, a P-type enhancement mode transistor (normally-off type) is preferably used as the thin-film semiconductor device for signal amplification. In particular, it is ideal to use a P-type enhancement mode transistor in which the minimum gate voltage $V_{min}$ satisfies the relationship of the following equation (30), and the threshold voltage $V_{th}$ is larger than $V_{GV}$, specifically satisfies the relationship of the following equation (31).

$$V_{min} < 0.1 \times V_{dd} < 0 \text{ or } V_{min} < V_{GT} < 0 \tag{30}$$

$$0.91 \times V_{dd} < V_{th} < 0 \text{ or } V_{GV} < V_{th} < 0 \tag{31}$$

SECOND EMBODIMENT

An embodiment of a smart card (IC card, hereinafter) that employs the electrostatic capacitance detection device according to the embodiment of the invention as a fingerprint sensor (target object detection sensor) will be described below.

Figure 8:
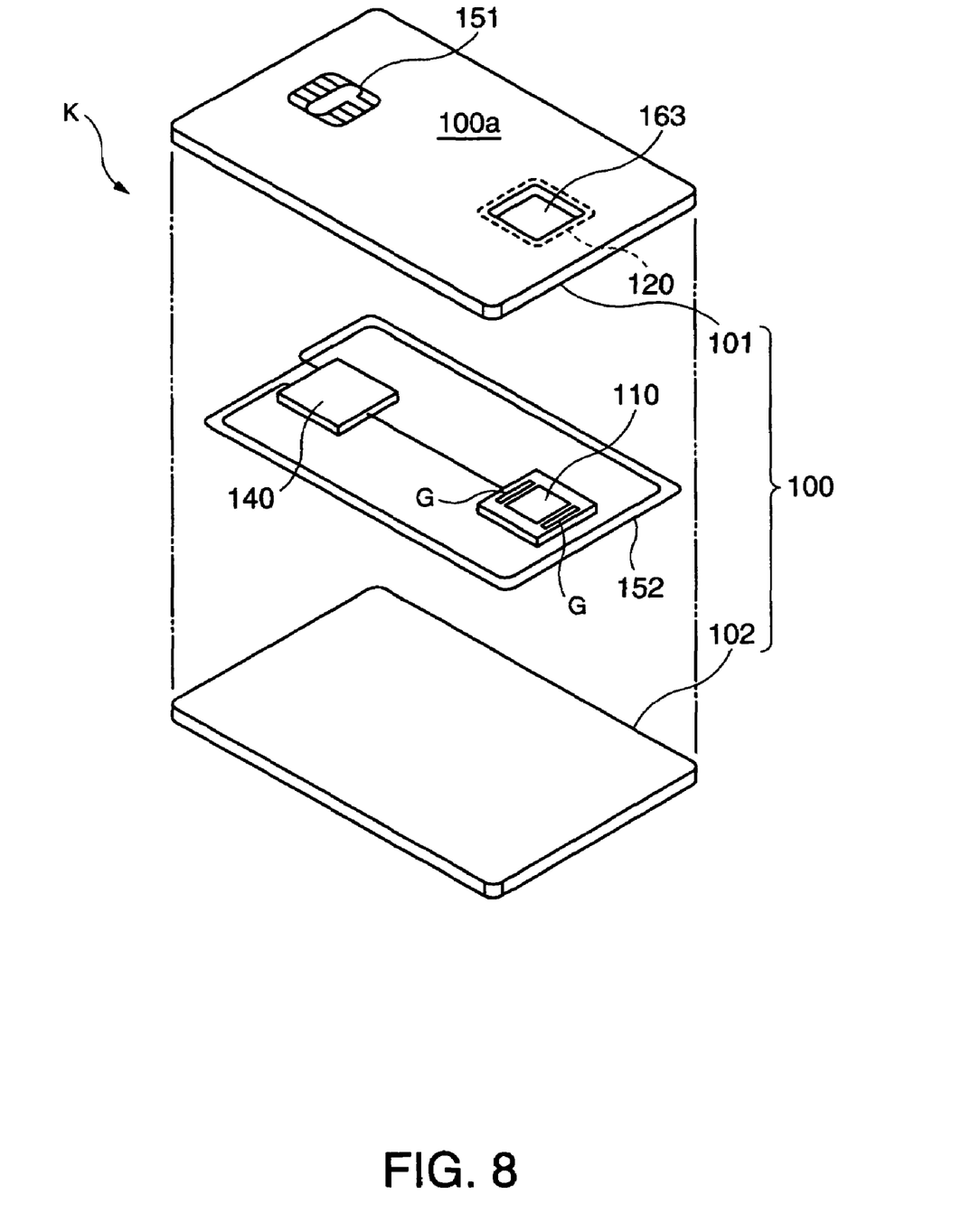
FIG. 8 is an exploded perspective view illustrating an IC card according to a second embodiment of the invention.

FIG. 8 is an exploded perspective view illustrating an IC card K. The IC card K includes a substrate 100 formed by attaching two base members 101 and 102 of plastic or the like, an IC chip (integrated circuit) 140 and a fingerprint sensor 110 that are interposed between two base members 101 and 102. The IC card K also includes a contact IC terminal 151 and a contactless IC antenna 152. The contact IC terminal 151 is an interface that is directly brought into contact with an external device (not shown), such as a card terminal, so as to exchange information with the external device. The contactless IC antenna 152 receives and transmits electric waves of a certain frequency from and to an external device. An opening 163 for exposing the detection surface of the fingerprint sensor 110 from the substrate upper surface is formed in an upper surface 100*a* of the base member 101. A charge removing electrode 120 for discharging electrostatic charged on a human body is also provided on the upper surface 100*a* of the base member 101. Providing the charge removing electrode 120 allows measurement of electrostatic capacitance between a finger and the sensor after electrostatic charged on a human body is discharged, avoiding discharge breakdown due to the electrostatic charged on the human body.

The contact IC terminal 151 is in contact with the upper surface of the IC chip 140 and is exposed from the upper surface 100*a* of the substrate 100. The contactless IC antenna 152 is formed in a coil between two base members 101 and 102. Although the present embodiment describes a combi card (dual interface) including a contact IC terminal and a contactless IC antenna, a card may include only a contact IC terminal (refer to ISO7816), or only a contactless IC antenna (refer to ISO14443 or the like). Alternatively, a hybrid card including contact and contactless IC chips may be used.

Figure 9:
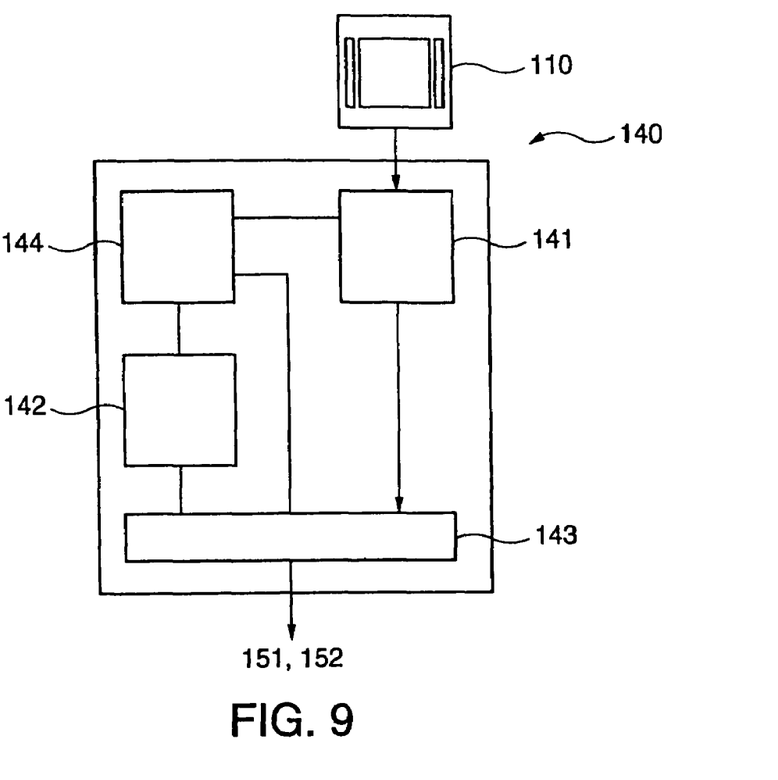
FIG. 9 is a schematic illustrating the configuration of the IC chip according to the second embodiment.

FIG. 9 is a schematic illustrating the configuration of the IC chip 140.

The IC chip 140 includes a data processing unit 141 that extracts feature of a fingerprint pattern loaded in the fingerprint sensor 110, a memory 142 that stores various types of information, such as feature of a specific fingerprint pattern, a comparator 143 that compares the feature extracted by the data processing unit 141 with the feature stored in the memory 142, and a control unit 144 that controls the operation of the IC card K. The comparator 143 is coupled to the contact IC terminal 151 and the contactless IC antenna 152.

The fingerprint sensor 110 shown in FIG. 8 is an electrostatic capacitance detection fingerprint sensor that employs the electrostatic capacitance detection device according to the embodiment of the invention. The fingerprint sensor 110 measures electrostatic capacitance that changes in accordance with the distance between the surface of a finger having ridges and valleys and the detection surface, so as to detect the fingerprint pattern. The fingerprint sensor 110 needs no light source and can thus be fabricated as a thin film device easily. In addition, adequate selection of a surface protective layer (passivation film) can improve the flaw resistance of the fingerprint sensor 110. Note that the specific circuit arrangement of the fingerprint sensor 110 is not described here since it has been described in detail in the first embodiment (refer to FIG. 2 and so forth). As described above, the electrostatic capacitance detection device according to the embodiment of the invention may be applied to a fingerprint sensor incorporated in an IC card (smart card). Although the contours of a finger (more specifically, a fingerprint pattern) are detected by measuring electrostatic capacitance in the above-described embodiments, it should be obvious that the contours of another target object may be detected.

What is claimed is:

1. An electrostatic capacitance detection device for detecting electrostatic capacitance that changes in accordance with a distance from a target object to read surface contours of the target object, comprising:
    electrostatic capacitance detection elements arranged in M rows and N columns;
    a power supply line supplying power to the electrostatic capacitance detection elements;
    an output line outputting a signal from the electrostatic capacitance detection elements;
    M row lines selecting the electrostatic capacitance detection elements disposed on a specific row; and
    N column lines selecting the electrostatic capacitance detection elements disposed on a specific column, wherein:
    the electrostatic capacitance detection elements each includes:
        a) a signal detection element storing a charge in accordance with the electrostatic capacitance;
        b) a row selection element causing the electrostatic capacitance detection element to enter a selected state in response to a signal from the row line;
        c) a column selection element causing the electrostatic capacitance detection element to enter a selected state in response to a signal from the column line; and
        d) a signal amplification element amplifying a signal corresponding to the charge stored in the signal detection element, wherein
    the signal detection element includes a capacitance detection electrode and a reference capacitor;
    the signal amplification element is a thin-film semiconductor device for signal amplification including a source electrode, a drain electrode and a gate electrode;
    the row selection element is a thin-film semiconductor device for row selection including a source electrode, a drain electrode and a gate electrode;
    the column selection element is a thin-film semiconductor device for column selection including a source electrode, a drain electrode and a gate electrode;
    the reference capacitor includes a reference capacitor first electrode, a reference capacitor dielectric film and a reference capacitor second electrode;
    the gate electrode of the thin-film semiconductor device for signal amplification, the capacitance detection electrode, and the reference capacitor second electrode are coupled to each other;
    the gate electrode of the thin-film semiconductor device for row selection is coupled to the row line;
    the gate electrode of the thin-film semiconductor device for column selection is coupled to the column line;
    the source electrode and the drain electrode of the thin-film semiconductor device for signal amplification, the source electrode and the drain electrode of the thin-film semiconductor device for row selection, and the source electrode and the drain electrode of the thin-film semiconductor device for column selection are coupled in series between the power supply line and the output line; and
    on-resistance of the thin-film semiconductor device for row selection and on-resistance of the thin-film semiconductor device for column selection are smaller than on-resistance of the thin-film semiconductor device for signal amplification.

2. The electrostatic capacitance detection device according to claim 1, wherein:
the source electrode of the thin-film semiconductor device for signal amplification is coupled to the power supply line;
the drain electrode of the thin-film semiconductor device for signal amplification is coupled to the source electrode of the thin-film semiconductor device for column selection;
the drain electrode of the thin-film semiconductor device for column selection is coupled to the source electrode of the thin-film semiconductor device for row selection; and
the drain electrode of the thin-film semiconductor device for row selection is coupled to the output line.

3. The electrostatic capacitance detection device according to claim 1, wherein the reference capacitor first electrode is coupled to the column line, and both the thin-film semiconductor device for signal amplification and the thin-film semiconductor device for column selection are either one of an N-type semiconductor device and a P-type semiconductor device.

4. The electrostatic capacitance detection device according to claim 1, wherein the reference capacitor first electrode is coupled to the row line, and both the thin-film semiconductor device for signal amplification and the thin-film semiconductor device for row selection are either one of an N-type semiconductor device and a P-type semiconductor device.

5. The electrostatic capacitance detection device according to claim 1, wherein the output line is individually provided for each column.

6. The electrostatic capacitance detection device according to claim 1, wherein a reference capacitor capacitance $C_R$ is more than one order of magnitude larger than a transistor capacitance $C_T$ of the thin-film semiconductor device for signal amplification, if the reference capacitor capacitance $C_R$ and the transistor capacitance $C_T$ are defined as follows:

$$C_R = \epsilon_0 \cdot \epsilon_R \cdot S_R / t_R$$

$$C_T = \epsilon_0 \cdot \epsilon_{ox} \cdot S_T / t_{ox}$$

where $S_R$ (μm$^2$) is an area of an electrode of the reference capacitor, $t_R$ (μm) is a thickness of the reference capacitor dielectric film, $\epsilon_R$ is a relative dielectric constant of the reference capacitor dielectric film, $S_T$ (μm$^2$) is an area of the gate electrode of the thin-film semiconductor device for signal amplification, $t_{ox}$ (μm) is a thickness of a gate insulating film of the thin-film semiconductor device for signal amplification, $\epsilon_{ox}$ is a relative dielectric constant of the gate insulating film, and $\epsilon_0$ is a permittivity in vacuum.

7. A smart card comprising:
a target object detection sensor that detects surface contours of a target object, the target object detection sensor being made up of the electrostatic capacitance detection device according to claim 1; and
an integrated circuit.

* * * * *